Figure 1:
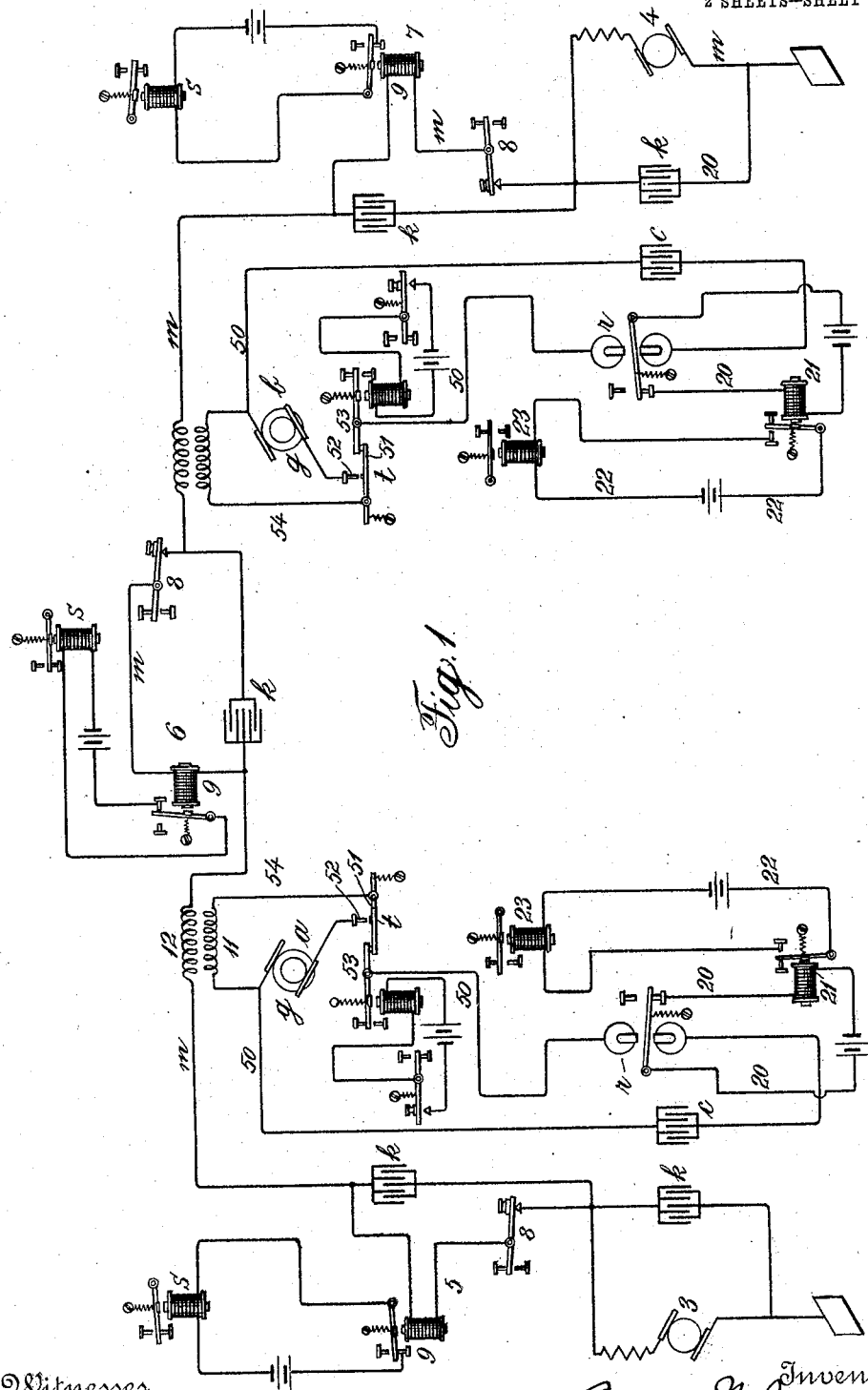

No. 800,155. PATENTED SEPT. 26, 1905.
F. W. JONES.
TELEGRAPHY.
APPLICATION FILED MAR. 11, 1905.
2 SHEETS—SHEET 2.
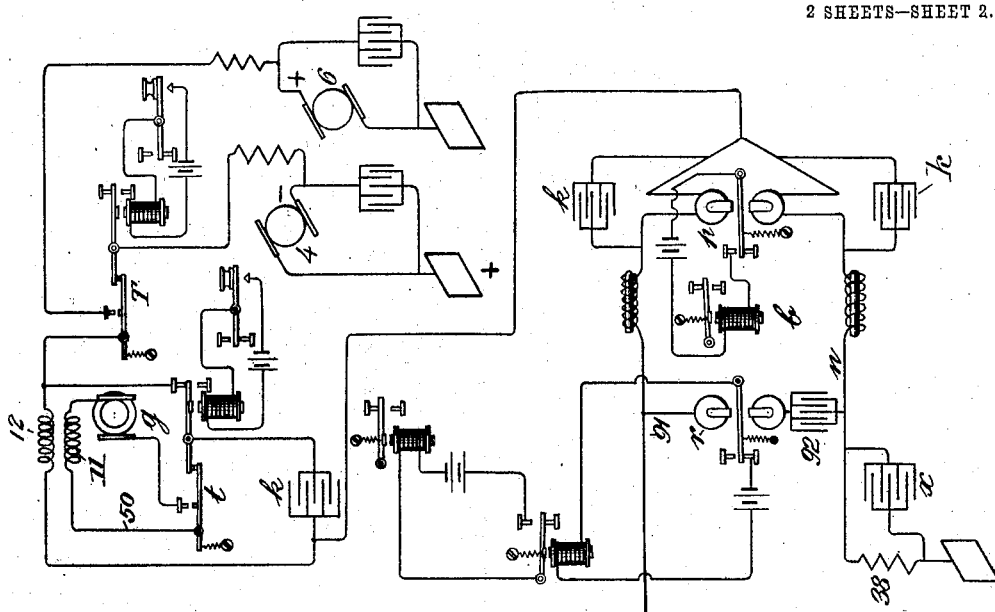
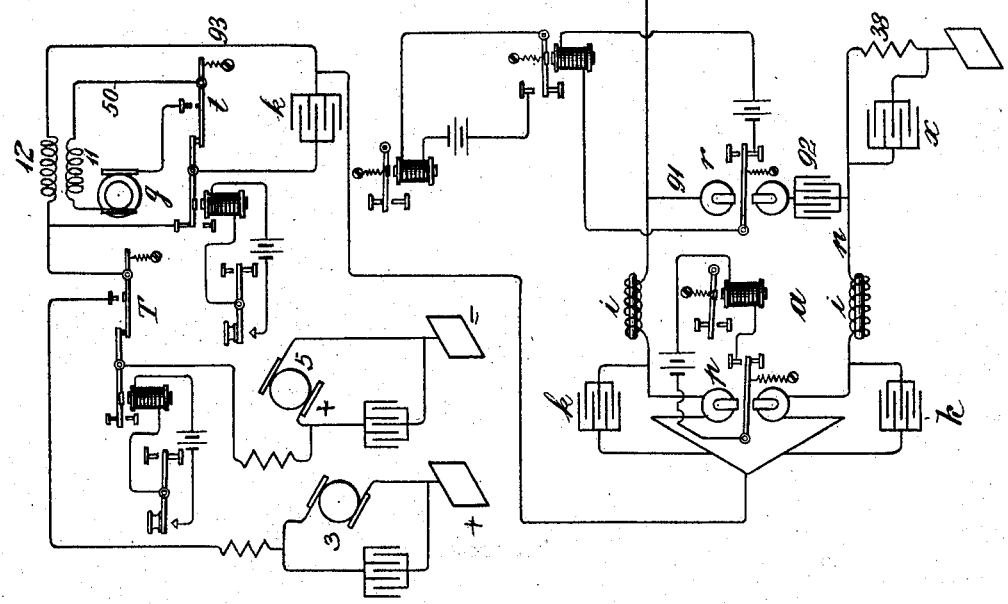
Fig. 2.
Witnesses
John E. Prager
A. M. Donlevy
Inventor
Francis W. Jones
By his Attorney

UNITED STATES PATENT OFFICE.

FRANCIS W. JONES, OF NEW YORK, N. Y.

TELEGRAPHY.

No. 800,155.  Specification of Letters Patent.  Patented Sept. 26, 1905.

Application filed March 11, 1905. Serial No. 249,521.

*To all whom it may concern:*

Be it known that I, FRANCIS WILEY JONES, a citizen of the United States, residing in the city of New York, in the county and State of New York, have made certain new and useful Improvements in Telegraphy, of which the following is a specification.

My invention relates to improvements in multiplex telegraphy where a number of separate independent messages are simultaneously transmitted without interference.

I provide a suitable conductor, such as an insulated wire, and transmit one set of signals on this circuit by varying the normal current, as by reversals or by making and breaking the circuit, or I provide balanced instruments at the terminal stations and transmit signals in opposite directions, as is common in duplex telegraphy, by varying or reversing the polarity of the current. On such circuits I also transmit one or more additional sets of signals in either or both directions by including in the circuit at each station one coil of a transformer or inductorium, the other coil of which is in a local transmitting and receiving circuit with a source of rapidly-alternating impulses of electricity and suitable transmitting and receiving devices, such as the Morse key, a continuity-preserving transmitter and a polarized receiving instrument with appropriate local circuits. The relay instrument for receiving the signals transmitted by means of rapid alternations is provided with the well-known "bug-trap" or repeating-sounder operating the sounder or recording device.

The accompanying drawings illustrate my invention.

Figure 1 shows a simple Morse circuit having superposed thereon means for transmitting a second set of signals. Fig. 2 shows a balanced or duplex circuit for transmitting signals simultaneously in opposite directions and superposed on said circuit means for transmitting two additional sets of signals in opposite directions simultaneously.

In Fig. 1, *m* is a main telegraph-circuit having main-line straight-current generators 3 and 4. There are three stations 5, 6, and 7. 5 and 7 are terminal stations. 6 is an intermediate station. At each of these stations 5, 6, and 7 there is an ordinary set of Morse signaling apparatus consisting of a key 8, relay 9, and sounder *s* operated through the medium of a local circuit. At each station 5 6 7 there is a condenser *k* in a branch circuit connecting opposite terminals of the set of instruments. The generators 3 and 4 have a similar condenser *k* in a branch circuit connecting their opposite poles. The object of this branch circuit with the condenser is to provide a path around the described instruments that shall be free to transmit short and rapid impulses of electricity of alternating polarity generated at the rate of four or five hundred per second. I have shown two stations *a* and *b* at intermediate points on the circuit *m* equipped with apparatus by which said stations are enabled to carry on a separate and independent set of signals simultaneously with the operation of signaling between the simple Morse stations 5, 6, and 7. The apparatus is alike at both stations *a* and *b*. *g* is an alternating-current generator operated by any suitable power and capable of developing four or five hundred alternations per second. This generator is continuously operating and is connected in a local circuit with the primary coil 11 of a transformer the secondary coil 12 of which is in the main line *m*. By this means impulses are generated or produced flowing in one direction in the circuit *m*, as distinguished from impulses thrown onto the circuit *m* through a condenser to divide and flow in both directions. These transformer-coils have preferably wire of the same size, the same resistance, preferably low, and the same number of turns or convolutions. *r* is a relay or receiving instrument, preferably polarized. Relay *r* operates a local circuit 20, containing a repeating-sounder 21, and repeating-sounder 21 controls a local circuit 22, in which there is a Morse sounder 23. This arrangement of two local circuits, one of which operates the other, is known to artisans and operators as a "bug-trap." *t* is a continuity-preserving transmitter operated by a magnet, a local circuit, and a Morse key in a manner well understood. 50 is a local circuit extending from one terminal of the generator *g* to one plate of the condenser *c*, thence from the second plate of the condenser through the coils of the relay *r* to the transmitter-lever 53, thence to the lever 51, coil 11 of the transformer, to generator *g*. When the transmitter *t* is operated, the lever 53 in the local receiving-circuit 50 breaks contact with the lever 51 and lever 51 closes on the contact 52, thus completing the local circuit containing the generator *g* through the local branch 54 and coil 11. Upon the return movement a local circuit is completed including the wire 50, the relay *r*, transformer-primary 11, lever 51, lever 53, and condenser c. It will be noticed that the receiving instrument r is normally in a closed local circuit, including the coil 11, and is always ready to receive signals. This local receiving-circuit is interrupted during the operation of transmitting when the generator g is on a closed local circuit, excluding the resistance of the receiving branch.
In Fig. 2 I have shown an arrangement whereby I am able to transmit two messages and receive two messages simultaneously. m is a suitable telegraph-circuit. p represents polarized differential relays having one coil in the natural line m and one coil in the artificial line n with the resistance 38. Condensers x are arranged to give capacity to the artificial lines n in a well-known manner. The polarized relay p operates a sounder. r is a receiving instrument for the rapidly-alternating impulses of the character heretofore described by me. This relay operates the bug-trap arrangement of local circuits and sounders heretofore described. I balance the main line m with the artificial line n, giving to each the same resistance, capacity, and inductance. The relay r is included in a bridge-wire 91 containing condenser 92. At each station a and b there are straight current-generators of opposite polarity 3 and 5, 4 and 6. T is a pole-changing transmitter for changing from a generator 3 to 5 and back again, at station a, for instance, providing a means for reversing the current in a well-known manner, signals being transmitted by reversals in polarity of the main-line current. The transmitter t controls the alternating-current generator g in the local circuit 50 with the primary 11 of a transformer the secondary 12 of which is in the transmitter branch 93. There is a condenser k in a local branch circuit connected around the secondary coil 12 of the transformer. When the operating-lever of transmitter t is on its closed contact, outgoing signals in the transmitter branch 93 are balanced upon the relays p and r at station a, but are effective to operate the relay r at station b. The alternating impulses are not effective in the coils of the relay p at station a by reason of the presence of the inductance i, which may be made of any desired proportions; but these rapid alternations are effective in the receiving instrument r at station b, and by this arrangement two sets of signals may be transmitted from a to b and two sets of signals may be transmitted from b to a simultaneously without interference. Condensers k are placed in branch circuits around the coils of the relay p in both the line m and the artificial line n, the object being to afford a free path around the coils of the relay p for the alternating-current impulses.

What I claim as my invention, and desire to secure by Letters Patent, is—
1. The combination with a suitable telegraph-circuit of means for signaling by throwing into the line short and rapid alternations of current, said means including a local circuit having two branches at each station, a transformer inductively connecting both branches of said circuit with the main line, a source of rapidly-alternating current in one branch, a suitable relay in a second branch, and a device for opening the receiving branch and closing the transmitting branch and vice versa in the act of transmitting.

2. The combination with a main circuit connecting separated stations, of means for signaling by dividing a continuous current into impulses of varying length and means for signaling by dividing short and rapid current alternations into groups of varying length, means for rendering the relays or receiving instruments irresponsive to outgoing signals and responsive to incoming signals, consisting of an artificial line, a capacity and a resistance in the artificial line, an inductance in said line between said relays, an inductance in the main line between said relays, a condenser in series with the alternating-current relay in a branch wire connecting the main and artificial lines and branch circuits each containing a condenser connected to the terminals of the continuous-current relay in both the main and artificial lines.

3. The combination with a main telegraph-line connecting separated stations, of means for simultaneously exchanging signals in opposite directions by dividing a continuous current into impulses of varying length and means for simultaneously exchanging signals in opposite directions by dividing short and rapid current alternations into groups of varying length, means at each station for rendering the relays or receiving instruments irresponsive to outgoing signals and responsive to incoming signals consisting of an artificial line, a resistance and a capacity for said line, a condenser in series with the alternating-current relay in a branch wire connecting the main and artificial lines, a repeating-sounder operated by said relay, a reading-sounder operated by the repeating-sounder, a polarized relay differentially wound and connected into the main and artificial lines, an inductance in the main line between said relays, an inductance in the artificial line between said relays, a transmitter branch connected to the junction of the main and artificial lines containing a source of short and rapid current alternations controlled by a suitable transmitting device and a source of continuous currents controlled by a suitable transmitting device.

4. In a quadruplex telegraph the combination with a main telegraph-line connecting separated stations, of means for simultaneously exchanging signals in opposite directions by dividing a continuous current into impulses of varying length and means for simultaneously exchanging signals in opposite directions by dividing short and rapid current alternations into groups of varying length; means at each station for rendering the relays or receiving instruments irresponsive to outgoing signals and responsive to incoming signals consisting of an artificial line, a resistance and a capacity for said line, a condenser in series with a polarized relay having a single winding in a branch wire connecting the main and artificial lines, a repeating-sounder operated by said relay, a reading-sounder operated by the repeating-sounder, a polarized relay differentially wound and connected into the main and artificial lines and inductances in the main and artificial lines between said relays and a transmitter branch connected with the junction of the main and artificial lines containing a source of alternating current controlled by a suitable transmitter and a source of continuous currents controlled by a suitable transmitter.

5. In a quadruplex telegraph the combination at one terminal station of a main line, an artificial line, a resistance and a capacity for said artificial line, a differentially-wound polarized relay having a coil in the main line and a coil in the artificial line, a polarized relay having a single coil in a branch circuit connecting the main and artificial lines, a condenser in series with said relay in said branch, inductances in the main and artificial lines between said relays and a transmitter branch connected to the junction of the main and artificial lines containing a source of alternating currents controlled by a suitable transmitter and a source of continuous currents controlled by a suitable transmitter.

6. In a quadruplex telegraph, the combination at one terminal station of a main line, an artificial line, a resistance and a capacity for said artificial line, a differentially-wound polarized relay having a coil in the main line and a coil in the artificial line, a polarized relay having a single coil in a branch circuit connecting the main and artificial lines, a condenser in series with said relay in said branch; inductances in the main and artificial lines between said relays and a transmitter branch connected to the junction of the main and artificial lines containing a source of alternating currents controlled by a suitable transmitter and a source of continuous currents controlled by a suitable transmitter.

FRANCIS W. JONES.

Witnesses:
HARRY R. MONAHAN,
JOSEPH J. CARDONA.